United States Patent
Pisupati et al.

(10) Patent No.: US 9,626,641 B2
(45) Date of Patent: Apr. 18, 2017

(54) TENNIS GAME ANALYSIS USING INERTIAL SENSORS

(71) Applicant: Courtmatics, Inc., Milpitas, CA (US)

(72) Inventors: Bhanu Nagendra Pisupati, San Jose, CA (US); Andrey Reznik, Campbell, CA (US); Vadim Blank, Campbell, CA (US)

( * ) Notice: Subject to any disclaimer, the term of this patent is extended or adjusted under 35 U.S.C. 154(b) by 191 days.

(21) Appl. No.: 14/546,665

(22) Filed: Nov. 18, 2014

(65) Prior Publication Data

US 2015/0141175 A1 May 21, 2015

Related U.S. Application Data

(60) Provisional application No. 61/905,855, filed on Nov. 19, 2013.

(51) Int. Cl.
| | |
|---|---|
| A63B 69/38 | (2006.01) |
| G06Q 10/06 | (2012.01) |
| G09B 19/00 | (2006.01) |
| G06K 9/00 | (2006.01) |

(52) U.S. Cl.
CPC ..... *G06Q 10/0639* (2013.01); *G09B 19/0038* (2013.01); *G06K 9/00543* (2013.01)

(58) Field of Classification Search
CPC ..... A63B 24/00; A63B 24/003; A63B 24/021; A63B 69/38; A63B 2220/30; A63B 2220/40; A63B 2220/44; A63B 2220/833; A63B 2225/50; A63B 2024/0056; G06Q 10/0639; G09B 19/0038; G06K 9/00543
See application file for complete search history.

(56) References Cited

U.S. PATENT DOCUMENTS

| | | | |
|---|---|---|---|
| 2011/0183787 A1* | 7/2011 | Schwenger | A63B 49/00 473/553 |
| 2013/0053190 A1* | 2/2013 | Mettler | G09B 19/0038 473/463 |
| 2013/0095962 A1* | 4/2013 | Yamamoto | A63B 69/38 473/464 |
| 2013/0127866 A1* | 5/2013 | Yamamoto | G06T 11/206 345/440 |
| 2013/0158939 A1* | 6/2013 | Yamamoto | G09B 19/0038 702/141 |
| 2013/0267338 A1* | 10/2013 | Boyd | A63B 69/36 473/223 |
| 2014/0206481 A1* | 7/2014 | Zuger | G06K 9/00342 473/463 |
| 2014/0342851 A1* | 11/2014 | Jackson | A63B 69/38 473/464 |

(Continued)

*Primary Examiner* — Raleigh W Chiu

(57) ABSTRACT

A method for analyzing a tennis session for game improvement using a portable device and a tennis analysis system, includes collecting information from the tennis session using the portable device attached to a racket used in a game for a plurality of strokes, transferring the collected information from the portable device to the tennis analysis system using a communication interface; analyzing information relating to the plurality of strokes; analyzing information relating to collections of strokes from said plurality of strokes to identify rallies, games, sets and matches played during the session, by said tennis analysis system; and generating a plurality of game statistics.

19 Claims, 17 Drawing Sheets

(56) References Cited

U.S. PATENT DOCUMENTS

| | | | |
|---|---|---|---|
| 2015/0016685 A1* | 1/2015 | Matsunaga | G09B 19/0038 |
| | | | 382/103 |
| 2015/0029341 A1* | 1/2015 | Sinha | H04N 5/772 |
| | | | 348/157 |
| 2015/0045153 A1* | 2/2015 | Thurman | A63B 69/38 |
| | | | 473/553 |
| 2015/0057778 A1* | 2/2015 | Mace | A63B 69/38 |
| | | | 700/91 |
| 2015/0057941 A1* | 2/2015 | Mace | G09B 19/0038 |
| | | | 702/19 |
| 2015/0120021 A1* | 4/2015 | Kerhuel | A63B 69/38 |
| | | | 700/91 |
| 2015/0141175 A1* | 5/2015 | Pisupati | G06Q 10/0639 |
| | | | 473/461 |
| 2016/0074739 A1* | 3/2016 | Pisupati | A63B 71/0669 |
| | | | 700/92 |

* cited by examiner

TENNIS GAME ANALYSIS USING INERTIAL SENSORS

The present application is based on, and claims priority from U.S. Provisional Application 61/905,855 filed on 19th Nov., 2013, the disclosure of which is hereby incorporated by reference herein.

TECHNICAL FIELD

The embodiments herein relate to tennis game improvement and, more particularly, to use of inertial sensors for tennis analysis and game improvement.

BACKGROUND

Tennis a racket sport that requires the use of a racket to swing at a moving ball. Like most sports, and particularly racket based sports, technique and analysis of game are essential aspects of effective game play.

Traditionally, in the game of tennis, players have been relying on their coaches to record information about patterns, technique, and game play during a game to get feedback for further development of their game. With the advent of Micro Electro-Mechanical Systems (MEMS), and standardized wireless (example, WiFi) and wired communication means (example, USB), it is now possible to build devices that can be attached to a Tennis racket to aid in various aspects of the game.

A few such devices have been developed to aid tennis players. Most of the devices focus on narrow aspects like swing pattern, power of a stroke, and so on. While such devices are very useful in providing specific help to players, they are unable to provide analysis beyond the strokes. Tactical aspects of the game that determine outcome of rallies and ultimately entire matches are not addressed by these devices. Further, most of the devices are unable to provide widely used statistics that are of interest to coaches and players. Such statistics are central to the understanding of a player's game, and provide valuable input in making necessary tactical changes for better results. While certain systems have been developed to provide analysis of a tennis game, they are very expensive and require extensive setup using multiple cameras, and therefore are out of the reach of most tennis players.

Therefore, there is a need for a simple system that can capture important information from game play and provide comprehensive analysis for game improvement.

BRIEF DESCRIPTION OF THE FIGURES

The embodiments herein will be better understood from the following detailed description with reference to the drawings, in which.

DETAILED DESCRIPTION OF EMBODIMENTS

Figure 1:
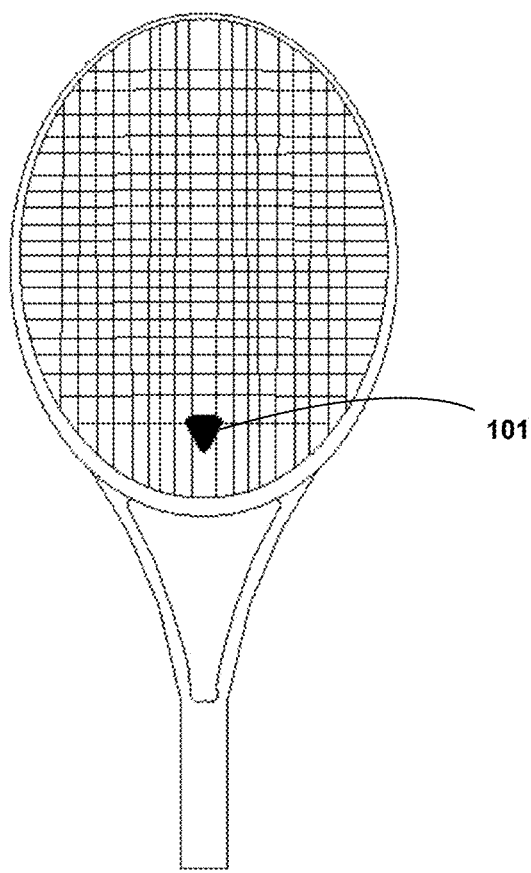
FIG. 1 is an illustration of a tennis racket with the portable device attached, according to various embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a portable device that may be in a form of a dampener device (also known as shock absorber) that is mounted on tennis rackets for capturing racket swings during tennis play, and a tennis analysis system for analyzing the captured data thereby enabling reconstruction of rallies and analysis of technique, tactics and strategy during play. Referring now to the drawings, and more particularly to FIGS. 1 through 14, where similar reference characters denote corresponding features consistently throughout the figures, there are shown embodiments.

Figure 2:
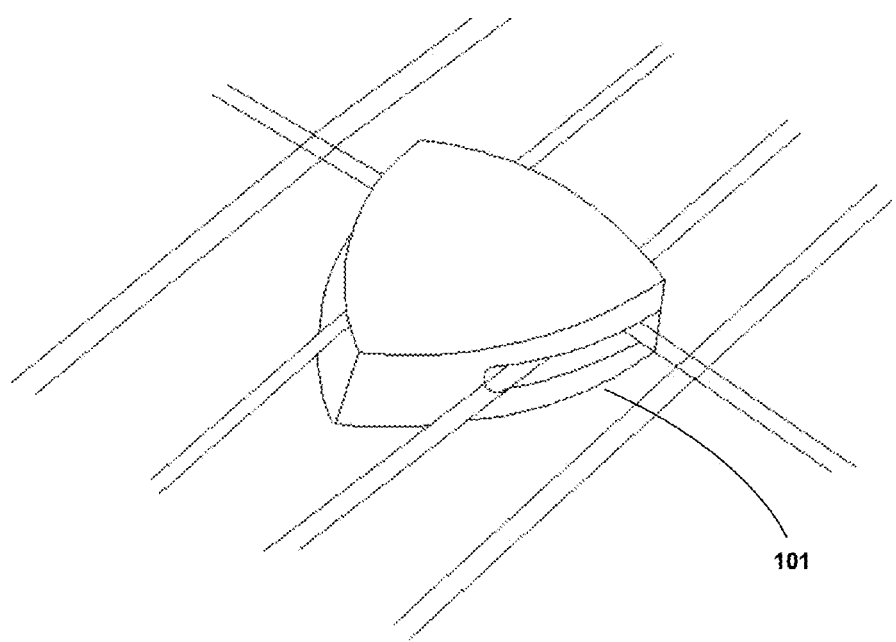
FIG. 2 is an oblique view of the portable device attached to the strings of a tennis racket like a dampener used on tennis rackets, according to various embodiments herein.

The portable device is a tennis accessory that can be mounted on top a tennis racket in a minimally intrusive manner for the purposes of collecting racket movement data as measured by sensors during play. The location of mounting can be on the strings, the frame or on the handle. In mounting the device on the strings as shown in FIG. 1, it could serve the same functionality as a conventional tennis dampener used by several players today in addition to its proposed usage to collect sensor data. FIG. 2 provides a closer look at how the device will rest on the strings, much like a conventional tennis dampener.

The said device can be equipped with an input mechanism that can be used by a player to mark a win or a loss for any point played upon completion. This information can be used to register the outcome of the rally while processing results.

Figure 3:
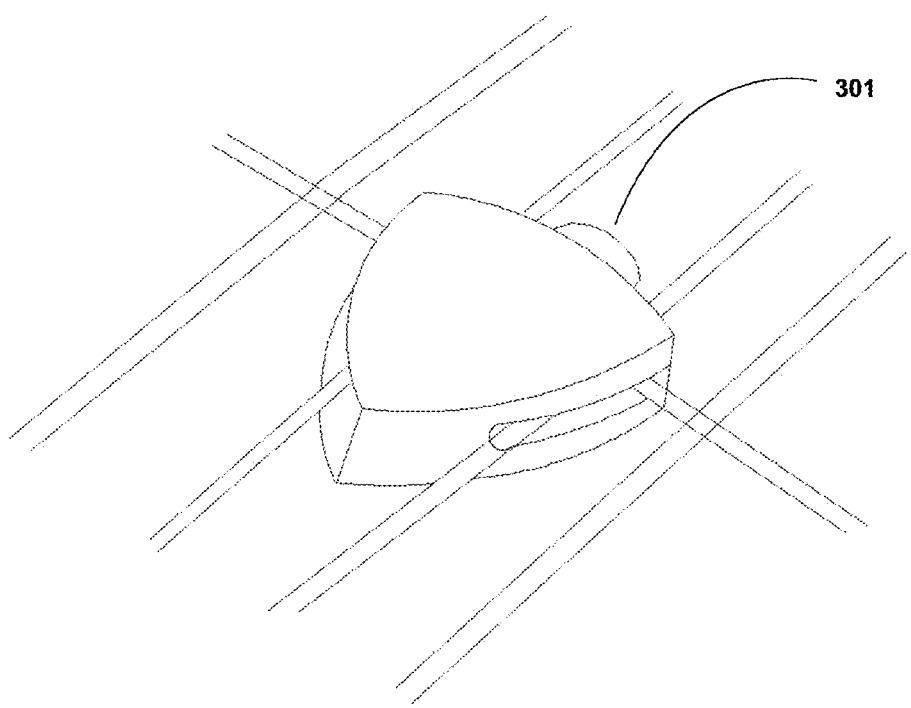
FIG. 3 illustrates the portable device with a push button included for user input of time markers and/or result of point, according to various embodiments herein.

The said input mechanism may be in the form of a push button on top of the dampener as shown in FIG. 3. The usage model could be such that the user pressed once to register a point won and twice in succession (like a mouse double click) to register a point lost. The device can provide an audible feedback after each entry is made for user confirmation.

Figure 4:
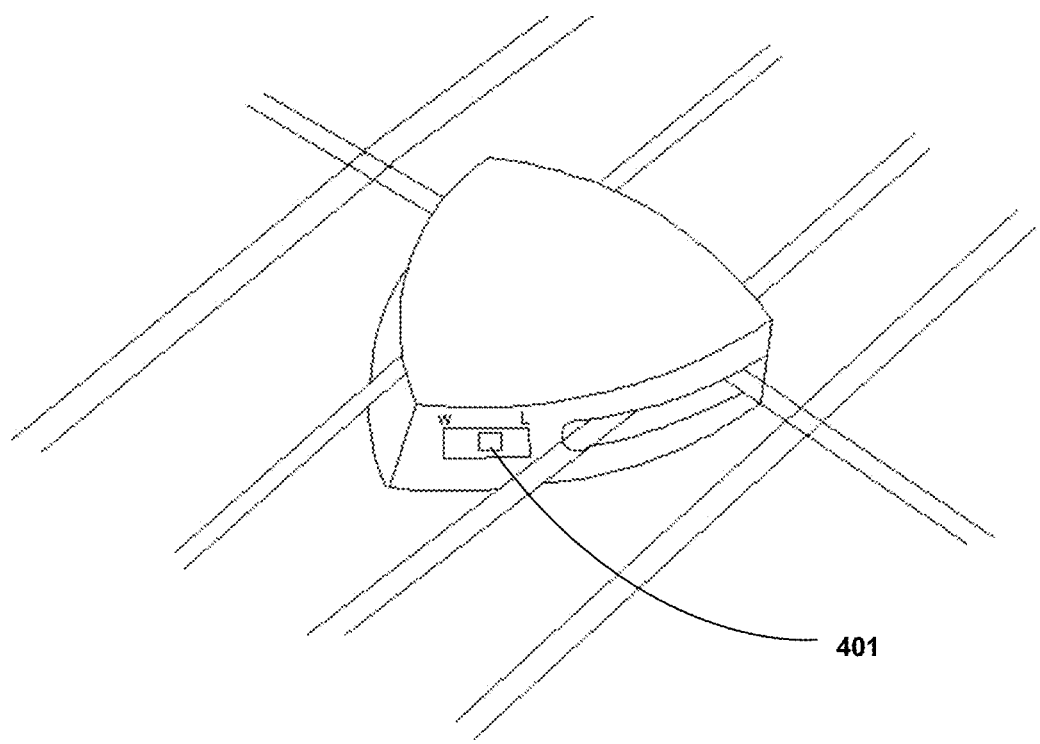
FIG. 4 illustrates the portable device with a switch included for user input, according to various embodiments herein.

The said input mechanism may be in the form of a 2 way selector switch as shown in FIG. 4, wherein the user can use the two selection states to register the result of a point won or lost.

The said device can be equipped with a mechanism to add time markers to the collected sensor data which the user can later use to identify significant times during play. For example, the marker can be used to make note of start and end of a set in a tennis match, or of a completion of a particular tennis drill. Markers can be used to perform analysis for sub intervals within a larger period of play.

In one embodiment, the push button mechanism described for register point win/loss information can be combined with the time marker mechanism by enabling creation of time markers through three presses in succession.

Figure 5:
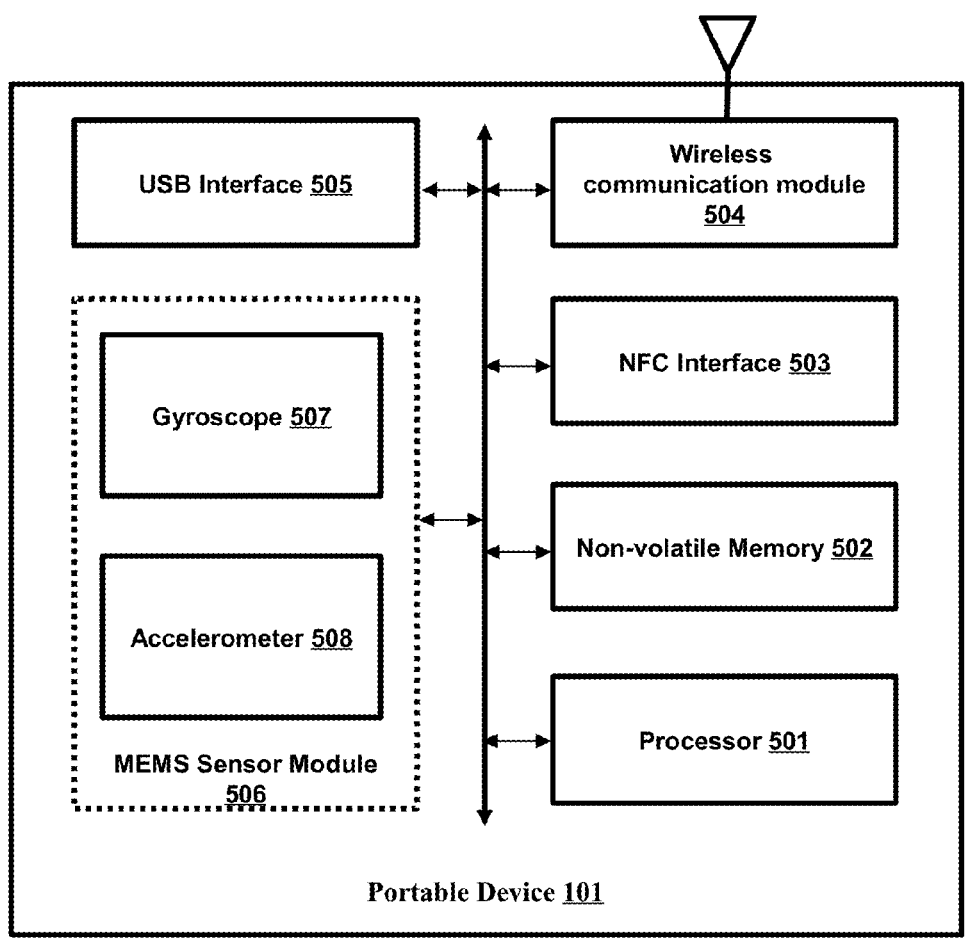
FIG. 5 is a block diagram of the portable device, according to various embodiments herein.

FIG. 5 is a block diagram of the portable device, according to an embodiment herein.

The device includes several hardware elements including Multi-axis MEMS sensors 506, Microprocessor 501, wireless communication module like Bluetooth 504, Non-volatile memory 502, Universal Serial Bus (USB) communication mechanism and a USB interface 505, Near Field Communication (NFC) module 503. Several of these electronic components in the device may be integrated into a single chip, such as a system on chip (SoC) device or a micro-controller, while others may be discrete chips. The circuit board may be enclosed in a lightweight protective casing made of rubber, plastic etc. thereby rendering a form factor similar to existing dampeners used on Tennis rackets today. The device is powered by an electric battery (not shown) on-board In some embodiments the device may also include a motion-powered charger, and an electro-acoustic transducer to charge the on-board battery.

The processing element (Microprocessor) in the said device executes software that periodically measures the acceleration and the rate of rotation for x, y, and z axis by respectively reading these values from the accelerometer 508 and gyroscope 507. If these accelerometer and gyroscope devices are implemented as part of the same chip then these values may be read at designated memory addresses where these devices have been memory mapped. In case the sensors are external to the chip then standard inter chip communication protocols such as SPI or I2C can be used. The data is then stored into Non-volatile memory first and then eventually transmitted externally through Bluetooth 504, USB 505 or NFC 503 interfaces.

In various embodiments, the rate at which readings are recorded may be dynamically varied to optimize the memory required for storing the data and also conserve battery power, for instance by logging data at a higher rate during active play and tempering the rate during periods of inaction.

In various embodiments, the software on the device 101 may in times of extended inactivity have the ability to transition the processor 501 to sleep mode during which it runs off a lower clock frequency and stops sensor data collection thereby enabling non-volatile memory 502 to enter low power modes as well. The processor 501 is then woken up through interrupts from the sensors interrupts that fire when readings exceed a defined threshold.

In various embodiments, the software may also optimize the power consumed by the non-volatile memory 502 by buffering readings over a period of time, which are then written together as a single write operation to the non-volatile memory 502 thereby allowing it to enter lower power states in between writes.

In some embodiments, the software may first encrypt collected data before writing to non-volatile memory 502, so that the data can be successfully read off the device only by genuine software that has the necessary secret encryption key information.

In other embodiments, the software may periodically add check sum values to the data stored into non-volatile memory 502. This can be used to ensure that data integrity has been maintained when it is later processed.

Figure 6:
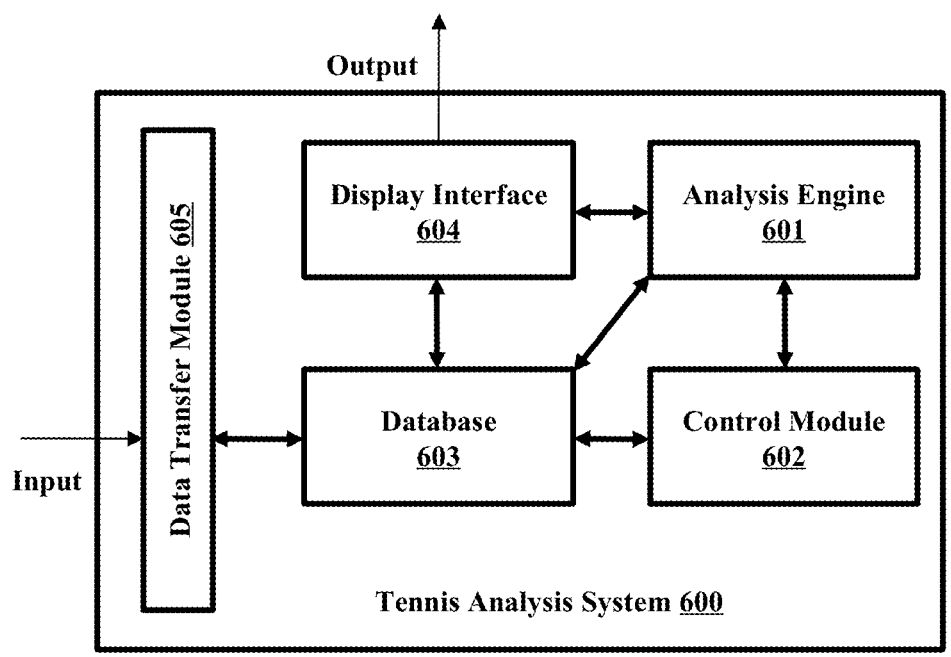
FIG. 6 is a block diagram of the tennis analysis system, according to various embodiments herein.

At the completion of a tennis session, data is retrieved from the device 101 by a tennis analysis system, as illustrated by a block diagram in FIG. 6. The tennis analysis system comprises of an analysis engine 601, a control module 602 with logic to pre-process information retrieved for analysis, a database 603 to store information obtained from portable device 101 or any information in process during analysis, a display interface 604 to provide visualization for information in the database 604 or for information obtained from the analysis engine 601, and a data transfer module to facilitate transfer of information from portable device 101 to the analysis system 600.

A tennis analysis system 600 is any computing device capable of executing applications to perform analysis on the data. Examples of the analysis system includes but not limited to personal computing devices such as laptops, smart phones, desktops, or tablets, and server grade systems using communication interfaces such as Bluetooth, USB and NFC. An data transfer module 605 in the system 600 relays the data to the database 603 for storage and further analysis.

Figure 7:
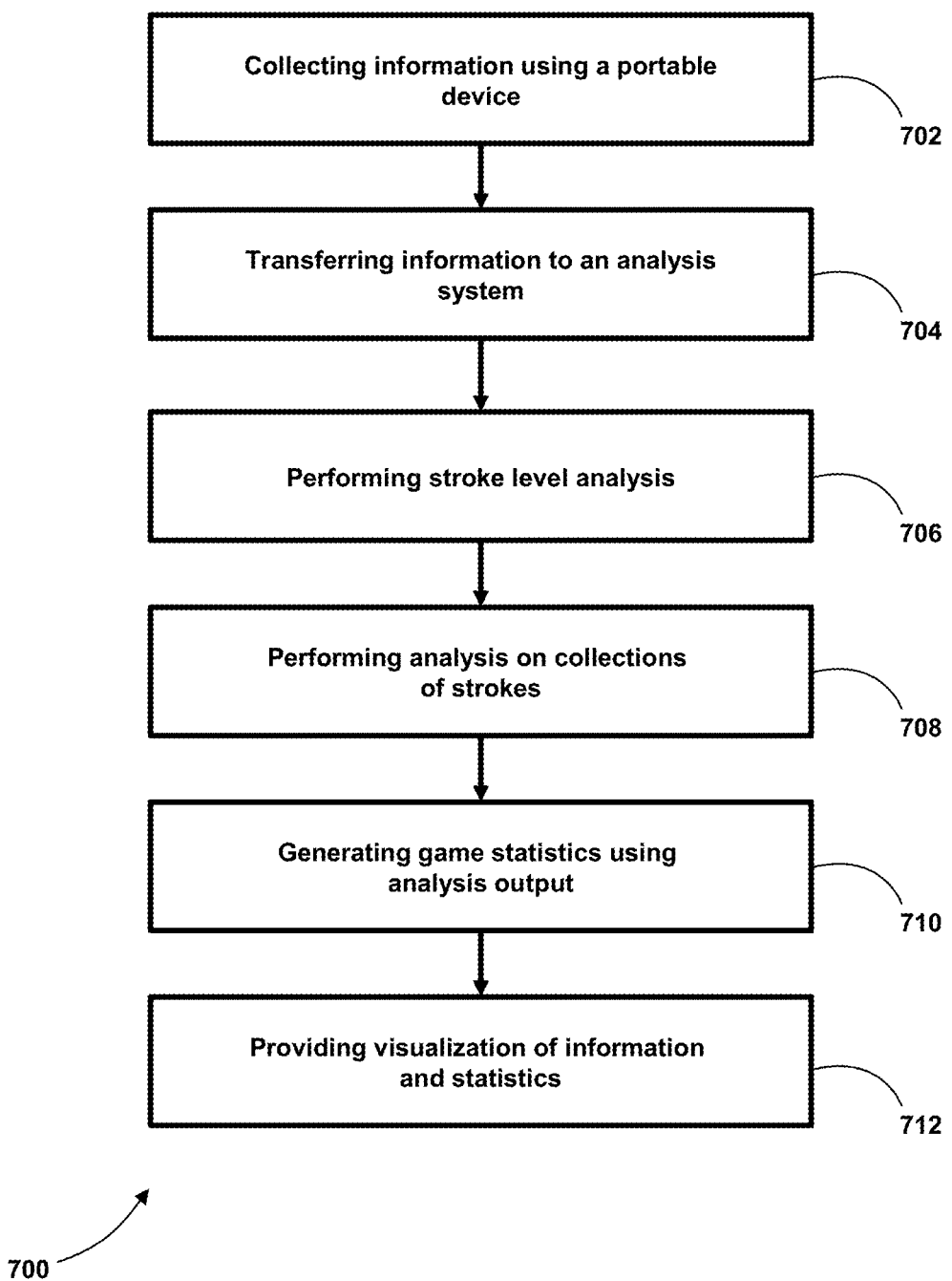
FIG. 7 is a flow chart depicting a process of analysis for game improvement for a tennis player, according to various embodiments herein.

FIG. 7 is a flow chart depicting a process of analysis for game improvement for a tennis player, according to an embodiment herein. The method involves collecting (702) information from movements of a Tennis racket to which portable device 101 is attached. The information collected through the sensors in the sensor module 506 is then transferred (704) to the analysis system 600 through a wired communication mechanism like USB, or a wireless communication technology like Bluetooth or NFC.

The tennis analysis system 600 processes the information obtained from portable device 101 to perform (706) stroke level analysis. The information obtained may include data from multiple sessions. Users may select to analyze a single session or a groups of sessions together. A session may be a sequence of rallies, points, games, sets, matches and so on.

Depending on the need, a user may choose to analyze data either from a single session or from multiple sessions at the same time.

Stroke level analysis includes but is not limited to classification of strokes, analysis of swing, identifying timing accuracy, sweet spot accuracy of strokes, among others. Subsequent to stroke level analysis, the system 600 also performs (708) analysis on collection of strokes to identify rallies, and associated indicators to be able to generate meaningful statistics for user when required. After completing analysis of stroke information, both at individual stroke level and at the level of collection of strokes, the system stores relevant analysis output in the database for retrieval based on user requests.

When a user interacts with the system to view information from the session or analyze his game, the system may generate (710) various statistics based on the user request. User is presented (712) with such information and statistics through visualization on the display interface.

The various actions in method 700 may be performed in the order presented, in a different order or simultaneously. Further, in some embodiments, some actions listed in FIG. 7 may be omitted.

The various analyses performed by the analysis system 600 is disclosed in the following sections.

Stroke Level Analysis

Figure 8:
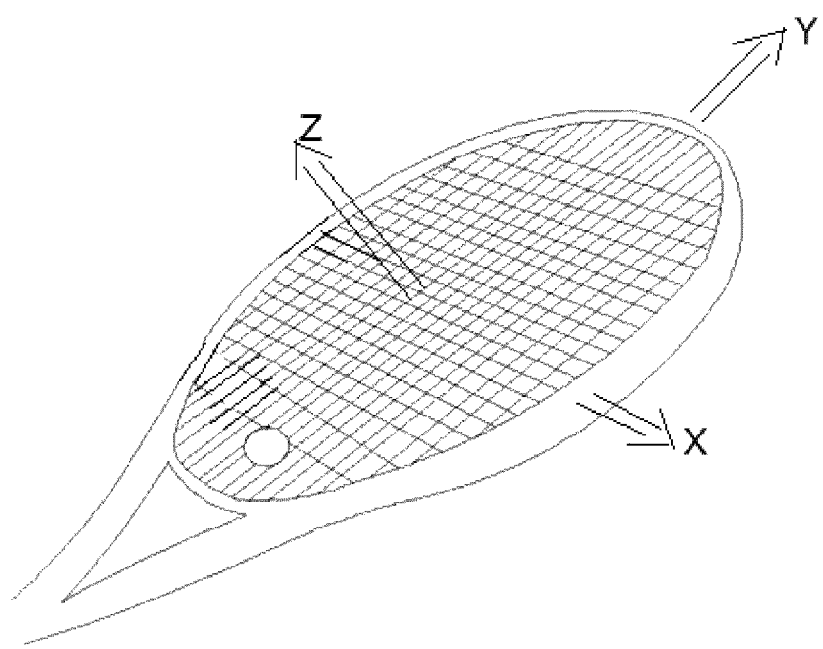
FIG. 8 illustrates the axes that will be referred to in performing various calculations according to various embodiments herein.

FIG. 8 illustrates the axes that will be referred to in performing various calculations according to various embodiments herein.

In performing stroke level analysis, the analysis system 600 classifies each valid tennis stroke as forehand, backhand, serve, volley, slice, and so on.

Figure 9A:
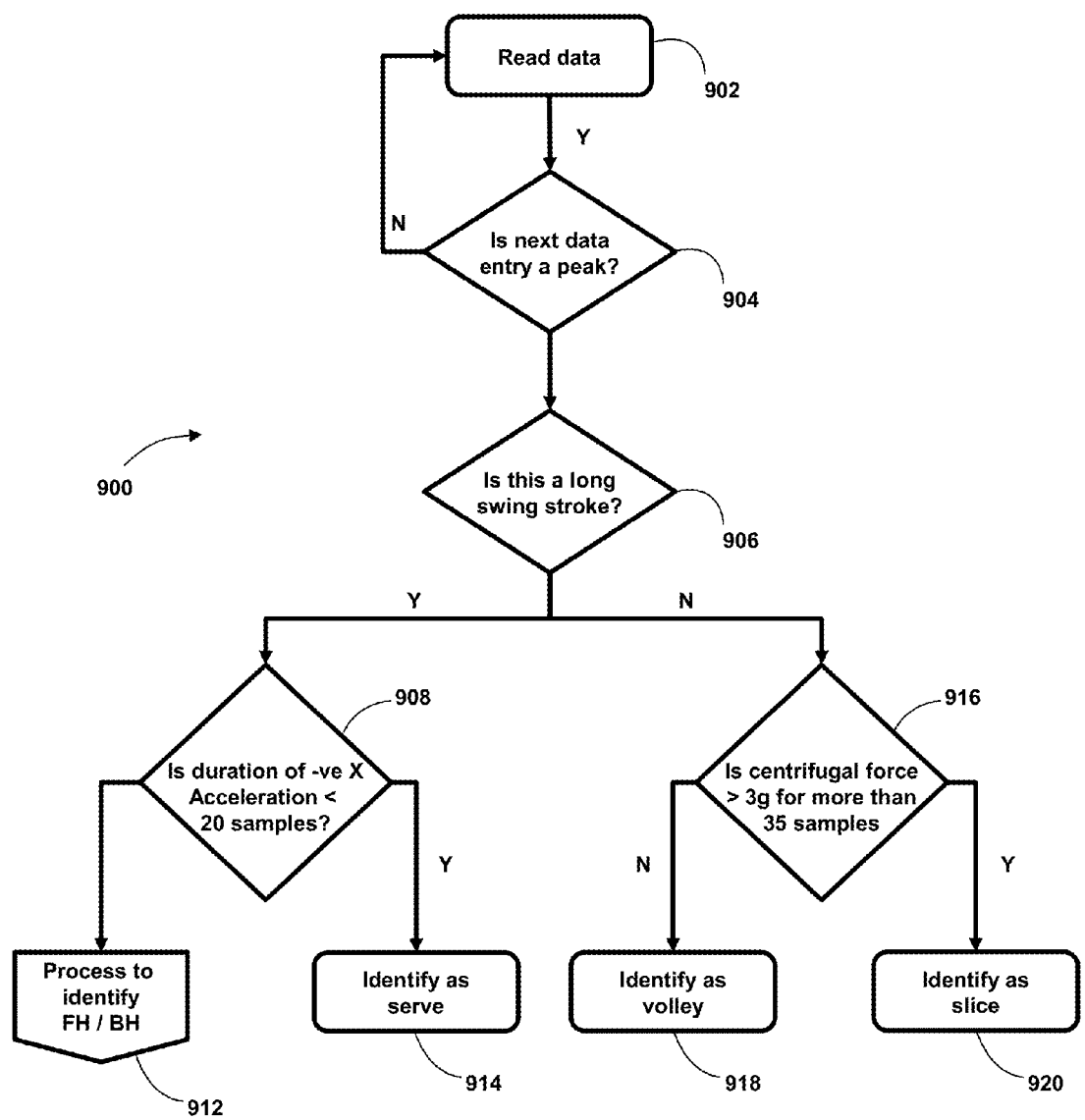
FIGS. 9A and 9B together is a flow chart illustrating the process of classifying a stroke, according to various embodiments herein.
Figure 9B:
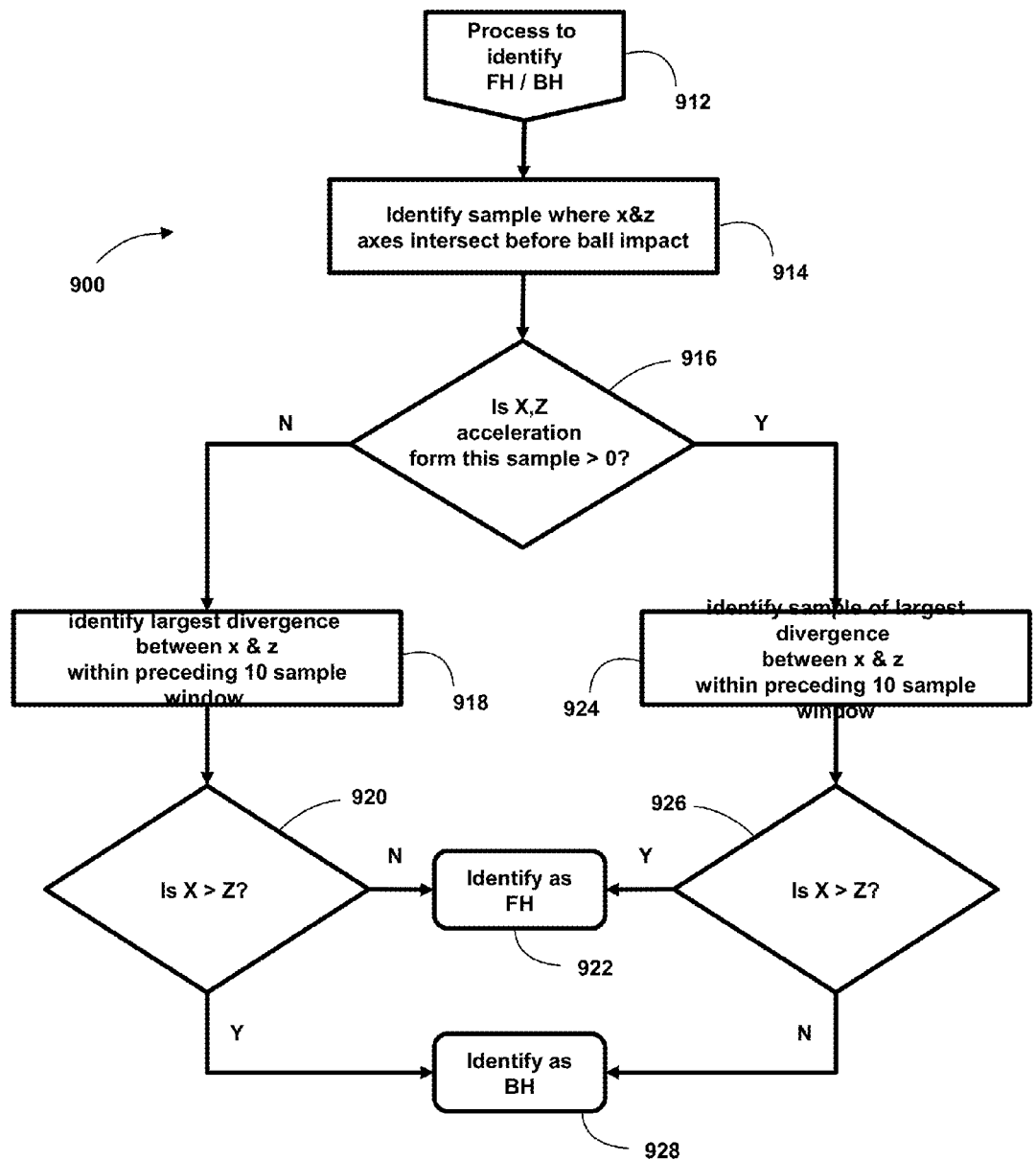

FIGS. 9A and 9B together is a flow chart illustrating the process of classifying a stroke, according to an embodiment herein. Now referring to FIG. 9A, as the analysis system 600 reads data (902) obtained from the portable device 101, it tries to identify the peak for a stroke. Every time data is read, the system 600 checks (904) for occurrence of a peak for the particular stretch of data associated with a stroke.

A stroke peak occurs when the following conditions are met:

Centrifugal acceleration due to swing (oriented along Y axis) must show at least 5 g of absolute acceleration.
Acceleration perpendicular to plane of racket (along Z axis) shows absolute acceleration increase of at least 3 g.
Square root of sum of squares of acceleration along X, Y, and Z axes is the highest within the stroke window and at the middle of the stroke window. Stroke window is defined as a number of consecutive data points that spans a specific duration, say 1.5 seconds. Therefore when sampling at 100 Hz, a stroke window is represented by 150 data points. Stroke window does not represent stroke swing from start to finish but rather represents a parameter that used for internal analysis.

Once the stroke data is read and it's peak is identified, the system checks (906) the category of the tennis stroke. Long swing strokes are forehands, backhands, and serves. Short swings are volleys and slices. Classification of stroke as long or short is based on the duration of the centrifugal force (Y axis) above minimum threshold. For example, minimum threshold could be at least 1 g that lasts for at least half of the stroke window (i.e. 80 data points when stroke window is 160) to classify stroke as a long stroke. Short strokes are strokes that exhibits same minimal g Force threshold along Y axis as long strokes but lasts at most half of the stroke window. Both parameters (duration and minimal threshold) could be adjusted up or down to fine tune the algorithm.

Once stroke category is identified, further classification into specific stroke types is based on duration (i.e. number of consecutive data points) of X, Y, and Z above specific thresholds. Thresholds and durations can be adjusted.

When a stroke is identified as a short swing stroke, the system may further distinguish between the short swing strokes slice and volley, to check (916) if centrifugal force (i.e. Y axis) is above 3 g for more than 35 points. When the criteria matches for a particular stroke, then the stroke is classified (920) as a slice stroke. If the criteria does not match, then the stroke is classified (918) as a volley stroke.

The said analysis system is able to identify serves by distinguishing it from other long swing strokes, namely: forehand (FH), and backhand (BH). When a stroke is classified as a long swing stroke, the system 600 may further classify the stroke either as a serve, FH or BH. Serve can be distinguished from FH and BH based on acceleration along X axis (perpendicular to racket handle along the place of the racket) as depicted in FIG. 14. Forehand and backhand (have similar X axis trend) exhibit substantial negative acceleration (shown in FIG. 13) while serve does not. This difference is used to determine maximum threshold that could be −1 g and maximum duration below this threshold to classify a stroke as serve. For example, long swing stroke that exhibits acceleration along X axis of −1 g or less for duration of at most 20 consecutive data points would be classified as serve.

The analysis system 600 checks (908) for negative acceleration. In an embodiment, when negative acceleration along X axis is observed for less than 20 samples of data, then the stroke is classified (914) as serve. If not, system invokes (912) the process to further classify the stroke as either a FH or a BH.

To differentiate forehand from backhand a section of the stroke preceding impact with the ball is analyzed. To select the section for analysis, the right boundary is chosen based on the intersection of axis X and axis Z, we will call it point A. From that point going backward towards the start of the stroke for the maximum data range of 10 data points, the time stamp of the largest gap between axis X and axis Z is detected, we will call it point B. If the intersection between axis X and axis Z at point A is below zero, then comparing values of axis X and axis Z at point B will indicate a forehand if axis Z >axis X and backhand otherwise. Conversely, if the intersection between axis X and axis Z at point A is above zero, then comparing values of axis X and axis Z at point B will indicate a forehand if axis Z<axis X and backhand otherwise.

Now referring to FIG. 9B, once the process for classifying a stroke as either a FH or a BH is invoked, the system 600 identifies the sample where X and Z axes intersect before ball impact. Further, it is checked to see if the acceleration on the X and Z axes from the identified sample at intersection of X and Z axes is positive (greater than zero). Furthermore, after obtaining (918, 924) the sample of largest divergence in the last 10 samples window, it is checked (920, 926) if X value at this sample is greater than Z value.

If the acceleration on the X and Z axes from the identified sample at intersection of X and Z axes is positive, and if the X value is greater than Z value at the sample of largest divergence in the last 10 sample window, then the shot is identified (922) as a FH. If the acceleration on the X and Z axes from the identified sample at intersection of X and Z axes is not positive, and if the X value is not greater than Z value at the sample of largest divergence in the last 10 sample window, then the shot is identified (922) as a FH as well.

If the acceleration on the X and Z axes from the identified sample at intersection of X and Z axes is positive, and if the X value is not greater than Z value at the sample of largest divergence in the last 10 sample window, then the shot is identified (928) as a BH. If the acceleration on the X and Z axes from the identified sample at intersection of X and Z axes is not positive, and if the X value is greater than Z value at the sample of largest divergence in the last 10 sample window, then the shot is identified (928) as a BH as well.

FIG. 14 illustrates the typical signature of accelerometer reading along one axis for the forehand stroke, according to various embodiments herein.

Figure 15:
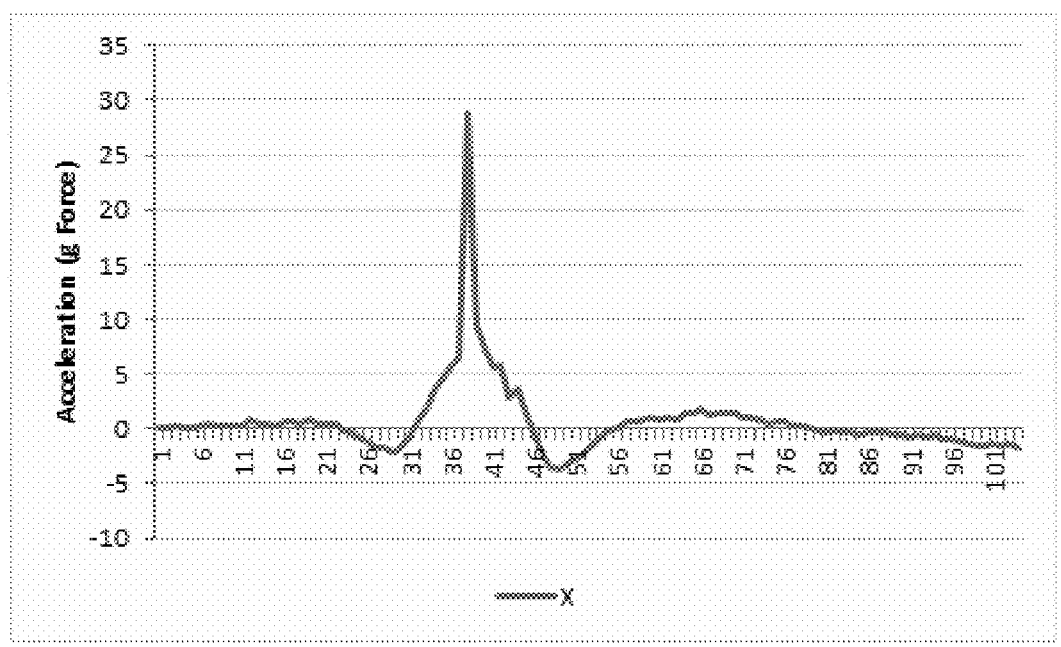
FIG. 15 illustrates the typical signature of accelerometer reading along one axis for a service stroke, which is in contrast to that for the forehand stroke, according to various embodiments herein.

FIG. 15 illustrates the typical signature of accelerometer reading along one axis for a service stroke, which is in contrast to that for the forehand stroke, according to various embodiments herein.

The various actions in method 900 in FIGS. 9A and 9B may be performed in the order presented, in a different order or simultaneously. Further, in some embodiments, some actions listed in method 900 may be omitted.

In various embodiments, the analysis system 600 may analyze several aspects of the swing corresponding to each stroke.

The said analysis system may indicate for each stroke the amount of top spin generated by the stroke, reflected by upward acceleration of the racket during swing motion preceding the impact with the ball.

Figure 10:
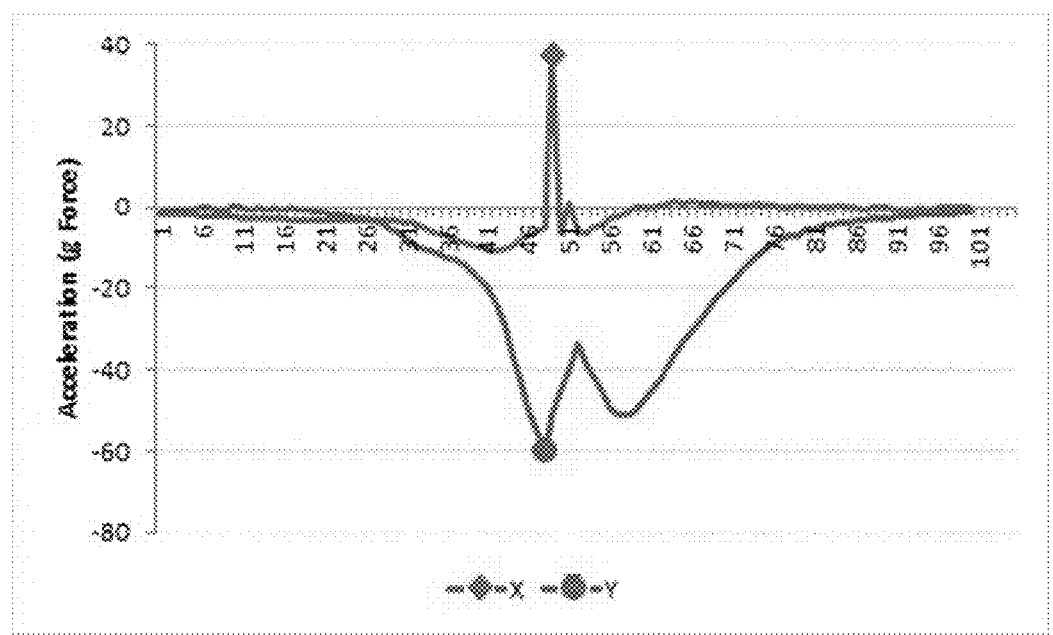
FIG. 10 relates to spin analysis of a tennis stroke; it shows the typical variance of accelerometer readings along two axes for a stroke with heavy top spin, according to various embodiments herein.
Figure 11:
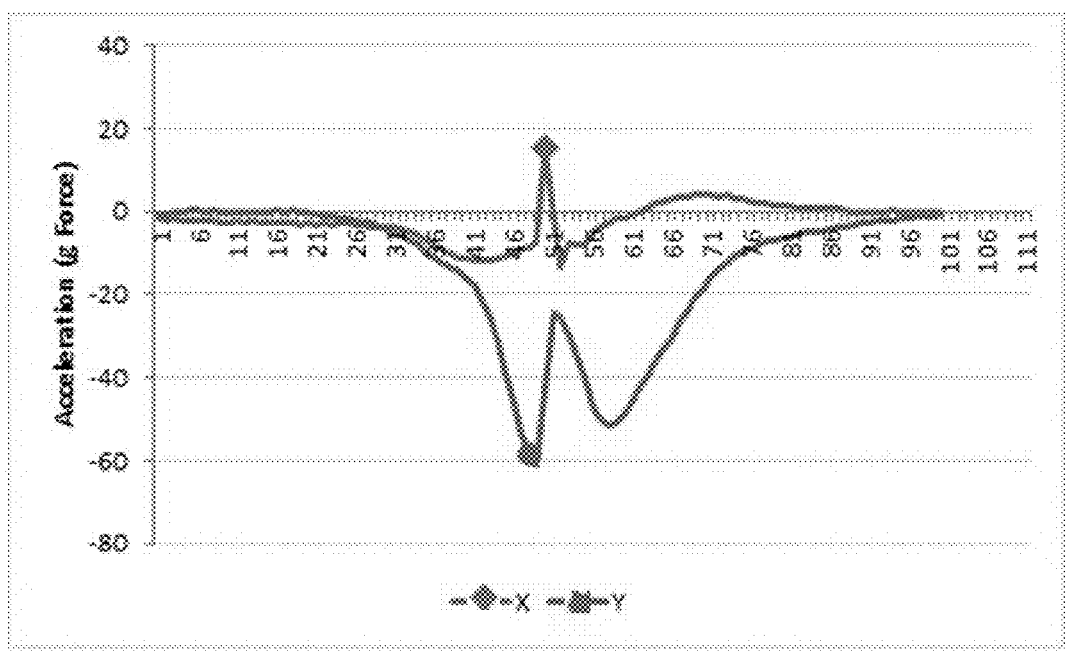
FIG. 11 relates to spin analysis of a tennis stroke; it shows the typical signature of accelerometer readings along two axes for a stroke with minimal top spin, in contrast to FIG. 8, according to various embodiments herein.

To determine how much top spin the stroke produces the ratio of X/Y could be used when X represents the peak acceleration along X axis and Y represents peak acceleration along Y axis. FIG. 10 & FIG. 11 respectively show that for similar centrifugal force (Y axis), top spin produces higher peak along X axis when compared to flat stroke. The use of ratio will neutralize swings with faster swings that produce greater centrifugal force to estimate the proportional upward acceleration.

In various embodiments, the analysis system may also indicate for each stroke the extent to which the ball hits the center of the racket—in what is known as sweet spot analysis. Sweet spot analysis can intuitively be thought of as indicating how clean the impact was of the ball on the racket. The closer the ball lands to the center of the racket the higher the degree of sweet spot designation the stroke receives. Sweet spot analysis is achieved through analysis of racket vibration at the impact with the ball as well as the amount of momentum loss when compared between the moment right prior to the impact with the ball and right after the impact with the ball. Higher vibration and higher loss in momentum represent lower sweet spot accuracy.

Figure 12:
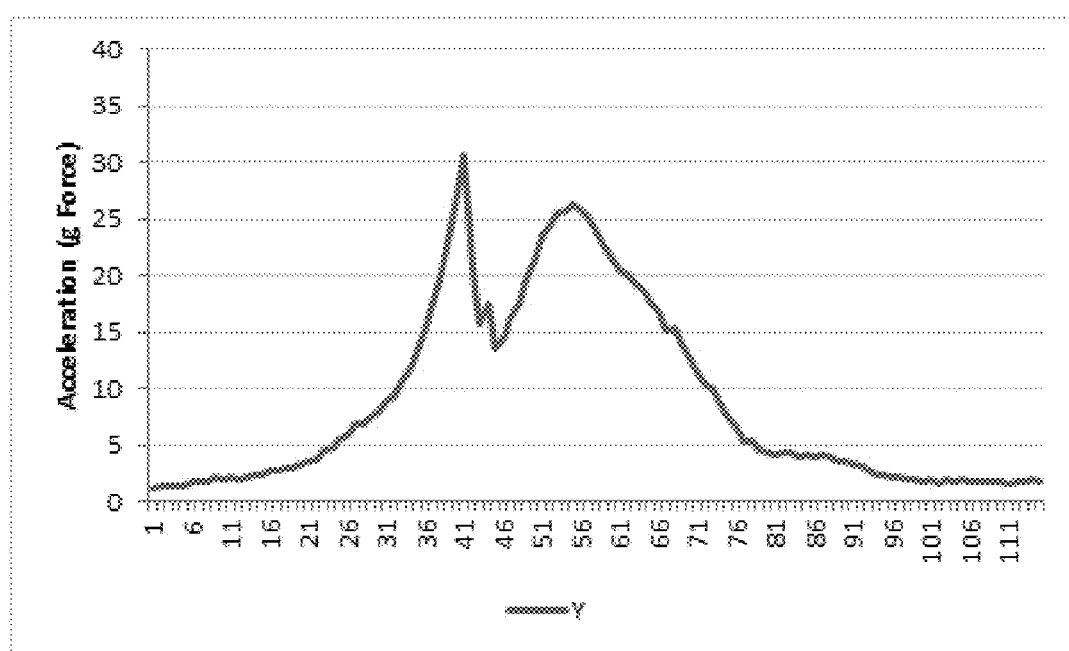
FIG. 12 relates to analysis of how clean the impact of the ball was on the racket in what is known as sweet spot analysis; it shows the typical signature of accelerometer reading along an axis for stroke with clean impact (close to sweet spot), according to various embodiments herein.
Figure 13:
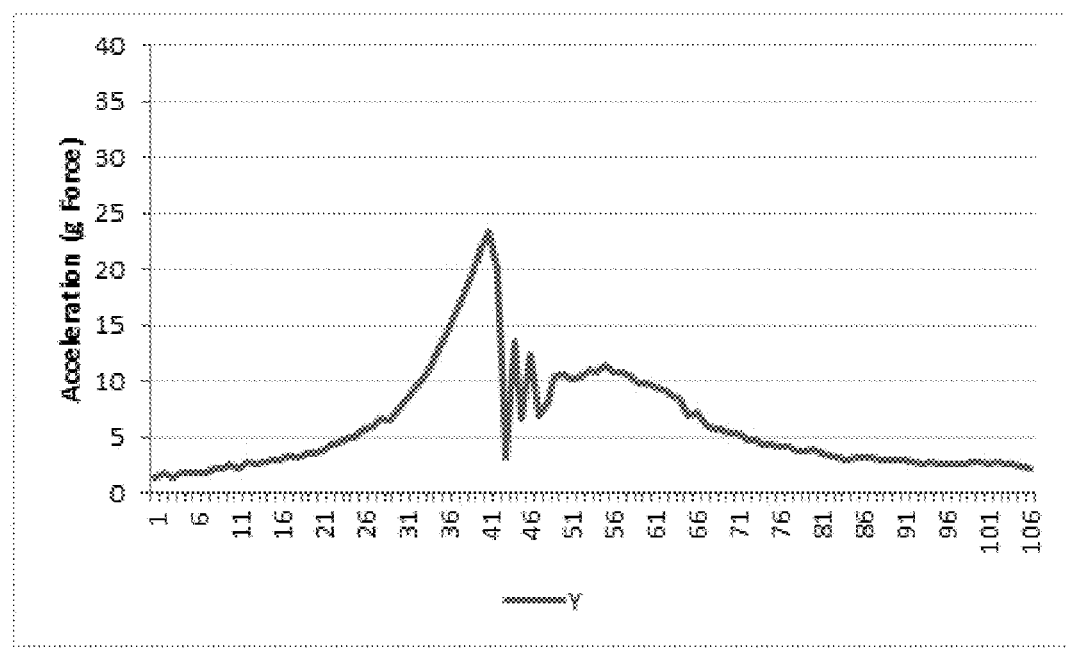
FIG. 13 relates to analysis of how clean the impact of the ball was on the racket in what is known as sweet spot analysis; it shows the typical signature of accelerometer reading along an axis for stroke with impact far away from sweet spot leading, according to various embodiments herein.
Figure 14:
FIG. 14 illustrates the typical signature of accelerometer reading along one axis for the forehand stroke, according to various embodiments herein.

FIG. 12 & FIG. 13 represent two scenarios with impact respectively close and far away from the sweet spot. When the impact is close to sweet spot (FIG. 12) it results in lower momentum loss in Y axis acceleration (centrifugal acceleration) as opposed to case when impact is further away (FIG. 13). Momentum loss is defined as the ratio of the second peak relative to first peak along Y axis. This illustrated in the charts wherein the ratios of these values are 0.85 and 0.48 for the two cases respectively, thereby indicating that the first impact is closer to the sweet spot. The vibration exhibited by Y axis on the right chart should be filtered (second peak occurs at $56^{th}$ reading). The vibration that was filtered when determining second peak could be used to determine and support sweet spot accuracy as well. This could be calculated in number of ways, one of which could be the g Force change between consecutive data points between the first and the second peak as identified earlier. Larger delta represents greater vibration. To neutralize for faster and slower swings, vibration could be estimated as a ratio relative to the first peak.

In some embodiments, the said analysis system 600 may produce information on the swing speed of the tennis racket head right prior to the impact with the ball. An estimate of the swing speed of the racket may be made based on the centrifugal acceleration experienced and logged during the swing. The equation for the acceleration=$V^2/R$, where V=swing speed, and R is the radius of the instantaneous circle traced by the device. The value of R may be determined based on the racket type being used by the user in combination with an estimate of length of user's arm—which is determined based on user height as entered in his/her profile.

In some embodiments, The analysis system 600 may also produce information on the timing of the stroke motion. Racket head preparation timing is the time lapse between the start of the swing motion and the racket impact with the ball. Racket follow through timing is the time between the racket impact with the ball and the finish of the swing motion. Swing timing analysis may include but not limited to the racket head preparation timing by stroke type, racket follow through timing by stroke type, and average swing duration by stroke type.

In various embodiments, the analysis system 600 also performs swing analysis for one or more types of strokes. Swing analysis begins with stroke peak identification, which is in turn used to determine the time of the ball impact with the racket string bed. The start of the swing determined based on Y axis acceleration (centrifugal acceleration) above a threshold (for example, at least 1.5 g). The finish of the swing is determined when the acceleration along Y axis reduces below the threshold and stroke peak occurred within the stroke window (stroke window defined earlier).

The analysis system 600 can filter swings that do not involve hitting a ball as well as ball dribbles that do not represent tennis strokes. These swings do not meet the criteria of stroke peak due to either not producing sharp spike in Z axis or not exhibiting centrifugal force along Y axis to indicate a swing motion.

Further, the analysis system 600 can identify the consistency of swing for various stroke types and present a metric to the user based on input.

Analysis of Collection of Strokes

The said analysis system is able to identify the start and end of each rally based on the sensor data.

A rally is defined as a back and forth exchange of consecutive strokes where the minimum limit can be defined by the player (by default set to 3).

The analysis system 600 uses the rally information to perform rally analysis including but not limited to the number of rallies played, average duration of a rally, average number of strokes per rally, average time interval between consecutive strokes in a rally, number of strokes in the longest rally and the duration of the longest rally.

In a preferred embodiment, the interval between consecutive strokes is based on the time delta between the stroke peaks and may be limited to 3 seconds for consecutive strokes to be identified as part of the same rally. If the interval is greater than minimal duration (for example 3 seconds) the stroke may represent a new rally and the prior stroke may be considered to conclude a prior rally (as described earlier rallies must include minimum number of consecutive strokes in which case not every set of consecutive strokes with less than minimal time interval between stroke peaks would be classified as a rally).

The said serve analysis can further distinguish between first and second serves. A serve followed by ground strokes is identified as a first serve. A serve following another serve without ground strokes intervening is identified as a second serve. A service winner (generally referred to as an "ace" in tennis language) is recognized as belonging to being the only stroke in a rally and, hence, the following serve is categorized as another (next) first serve.

The said analysis system is able to calculate the first serve percentage based on its ability to calculate number of first and second serves.

The said analysis system can aggregate many of the mentioned statistics for a game, set, match or session (each called a collection) by running aggregation functions—such as average, sum maximum, minimum etc.—on the individual stroke and rally metrics on a collection of strokes. Aggregation can be performed for the stroke type thereby rendering the number of each type of strokes in a collection. This could, for example, be used by the user to discern whether most of the strokes in a particular match were directed towards forehand or backhand. Aggregation for top spin analysis may render the number of top spin strokes by stroke type, number of high top spin strokes (high top spin stroke can be defined by the player by setting a minimum threshold for the amount of top spin produced by the stroke), and number of flat strokes (flat stroke are strokes that produce below minimum amount of top spin which can be defined by the player). Aggregation for sweet spot analysis may include but not limited to the average sweet spot accuracy for each stroke type, number of sweet spot centered strokes by stroke type, number of mis-hit strokes by stroke type (mis-hit strokes are strokes that hit the frame of the racket), and number of moderately clean strokes by stroke type which represent all other strokes that are not sweet spot centered and not mis-hit strokes. Sweet spot analysis may also include the number of consecutive sweet spot centered strokes played during a single point.

Aggregation for serve can render the first serve percentage for a duration of play based on the collection The serve aggregation can also render numbers or percentages for various types of serves (slice, flat).

Game Statistics

The analysis system 600 can correlate stroke data with point win/loss data and thereby provide insights to common trends across points won and lost. An example of such an insight may be that the player tends to win a high percentage of points with short rallies, while the odds of winning the point tend to decrease as the rally grows longer.

A user can retrieve results of analysis through a dedicated application for laptops/smart phones/tablets or a web browser based user interface. The user interface presents results of the analysis described in a visual and numerical form for the user.

The user interface enables user to access results at the stroke, rally, match levels and user configurable time periods, while also offering trends, analysis and coaching inputs based on the collected data. Further information about the interface are presented in detail.

The user interface allows the user to filter stroke metrics for intervals within play between various time markers added by the user in course of play. This could for instance be used to retrieve the per-set statistics for these metrics.

The user interface allows filtering of stroke data based on a particular stroke attribute. The resulting "filtered" data can be run through various aggregation functions described earlier (such as average). Using this feature, the user can identify the average sweet spot metric, the top spin metric and swing speed for forehands or backhands exclusively.

If the player used the win/loss input mechanism to record the result of each point, the user interface allows filtering of data based on the result of the point. For example, the average (and ratio) of number of forehands and backhands hit for all points won or lost can be retrieved.

If the player used the win/loss input mechanism to record the result of each point, summary of outcome of a point when a certain pattern of play occurred can be identified. For example, percentage of point won/lost at the net can be identified. For example, win-loss percentage of rallies longer than a certain number of strokes can be identified. As another example, for all rallies with first serve in, the count of points won and lost can be retrieved. The same metric can be identified for rallies with second serve in. This can be used to identify the commonly used statistic in tennis of percentage of first and second serve points won.

In various embodiments, the system may allow for generation and visualization of one or more of the following tennis game and rally related statistics:

First serve percentage, where first serve percentage of a player is calculated as the percentage of rallies initiated by said player with only a first serve.

First serve points won, where first serve points won by a player is calculated as the percentage of rallies won by said player in all rallies initiated by said player with only a first serve.

Second serve points won, where second serve points won by a player is calculated as the percentage of rallies won by said player in all rallies initiated by said player with a second serve.

Number of net visits, where number of net visits is calculated as the number of rallies that include a volley shot.

Number of net points won, where number of net points won is calculated as the number of rallies that have a win marker and include a volley shot.

Percentage of points won for a given range of length of a rally, where the range is specified by a minimum number of shots and a maximum number of shots, where percentage of points won for a given length of rally is calculated as a percentage of rallies with a win marker having at least the minimum number of shots and at most the maximum of shots.

Number of break points converted, where number of break points converted is calculated as the number of rallies identified as a break point and having a win marker.

Number of points won of a specified stroke type, where number of points won of the specified stroke type is calculated as a total of the points with a win marker and having its last stroke classified as the given stroke type.

Percentage of points won using a specific predominant stroke, where said statistic is calculated as a percentage of rallies with a win marker and having more strokes than a pre-defined percentage of strokes as the specified predominant stroke.

Percentage of points won serving in a specified direction, where said statistic is calculated as a percentage of rallies initiated, with a win marker, and with the serve being in the specified direction.

Percentage of points won serving in a specified direction, where said statistic is calculated as a percentage of rallies initiated, with a win marker, and with the serve being in the specified direction.

Points won off a specific stroke, where said statistic is calculated as a total of rallies with a win marker and the specific stroke as the last stroke.

Points lost off a specific stroke, where said statistic is calculated as a total of rallies with a loss marker and the specific stroke as the last stroke.

Break points won among total break points, where said statistic is calculated as a percentage of points with a win marker of the total number of points identified as a break point. Break points may be identified using the result (win or loss) markers provided by the user.

Number of service winners, where said statistic is calculated as number of rallies with a win marker and only having one or more serve strokes.

The user interface is able to offer coaching tips for improving and refining a player's technique by analyzing various stroke metrics. For instance, the racket head preparation may be observed to be too short for strokes. For instance, it may detect that the user has too much of a take back on volleys.

The user interface can be used by the user to display trends in the mentioned metrics over a period of a single tennis session. For example, the player may see how the ratio of top spin strokes vs. flat strokes trended for the number of strokes per rally trended over a 2 hour tennis match for every ten minutes played. A player may notice that as he tires as the game progresses, the top spin metric tends to decrease since the player tends to go for winners more often. For example, the user can uncover that the swing speed tends to decrease over time in a session as the player tires.

The user interface can be used by user to perform comparison of data from different tennis sessions such as comparing two different sets in one match or comparing two different matches against the same opponent or different opponents. Comparison may also include longer periods such as comparing the entire historical data (which could be indicative of an average performance overall) to a particular tennis session to compare the above mentioned aspects of the tennis game (i.e. sweet spot, top spin, swing speed, swing timing, etc.). The player may choose start and end date for each of the two periods to compare or use previously created tennis session profiles. Comparison analysis will highlight similarities and differences in aspects of the games.

The user interface comparison feature can be used by user to identify aspects in which his game has improved over time. For example, the player may observe that the percent of perfect sweet spot strokes have gradually increased over the last two years. For example, the player may notice that the number of volleys (net play) has increased over time.

The user interface comparison feature can complement the coaching feature and be used by user to identify "bad habits" that may have crept into one's game, which may be hard to identify through the naked eye. For example, a player may realize that the follow through on the backhand stroke is not as complete as before resulting in a less effective stroke.

When analyzing data from a session, the user interface may provide analytical insights by performing multivariate analysis of various parameters such as stroke type, point outcome (win/loss), serving or receiving etc. The said analysis are pre-programmed into the stroke analysis system and may be added to in number and complexity over time. An example of such as analysis might be that when a user tends to win most of the rallies when a majority of strokes have been forehands.

When comparing data from two different tennis sessions the user interface may provide analytical insights drawn from both sessions in the form of feedback by performing multivariate analysis. For example, if the analysis shows that in second match the top spin was more prevalent and rallies where longer and the interval between strokes in a rally was longer, then the feedback could be that the game style was more defensive, less aggressive, and more consistent in a second match. The algorithm will process the parameters to analyze combination of data points to establish patterns that could be indicative of a particular useful insight to the player.

The user interface shall allow the user to share results of analysis through email and social networks. The results could be shared in numerical and graphical form.

The user interface shall allow users to compare their stroke metrics with other players. To do so those other players have to use the interface to provide consent for sharing this data. The players can use the interface to configure what information they are willing to share.

The user interface also allows the user to configure, annotate and refine the data that has been captured and the game analysis that has been rendered. By adding annotations in the said interface the user can include text captions and tags for a particular tennis session profile which describe the opponent, location of play, racket used and other aspects describing the session.

The user device may perform pre-processing of sensor data before writing it to storage. Data may be pre-processed to validate if the device is being currently used in tennis play and therefore whether or not to record sensor data. While device going into sleep state provides another mechanism to save non play sensor data from being recorded, data pre-processing o device allows richer algorithms to be implemented and used to identify tennis play. An activity such as walking with the device mounted on a racket is bound to produce sensor readings that will cause the system to wake up from deep sleep, but represents a case where the produced sensor readings should ideally not be recorded.

The embodiments herein disclose a portable device that is mounted on tennis rackets for capturing racket swings during tennis play, and a tennis analysis system for analyzing the captured data thereby enabling reconstruction of rallies and analysis of technique, tactics and strategy during play. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The methods on the portable device are implemented in a preferred embodiment together with a software program written in e.g. Very high speed integrated circuit Hardware Description Language (VHDL) another programming language, or implemented by one or more VHDL or several software modules being executed on at least one hardware device. The portable device may also include means which could be e.g. hardware means like e.g. an ASIC, or a combination of hardware and software means, e.g. an ASIC and an FPGA, or at least one microprocessor and at least one memory with software modules located therein.

Figure 16:
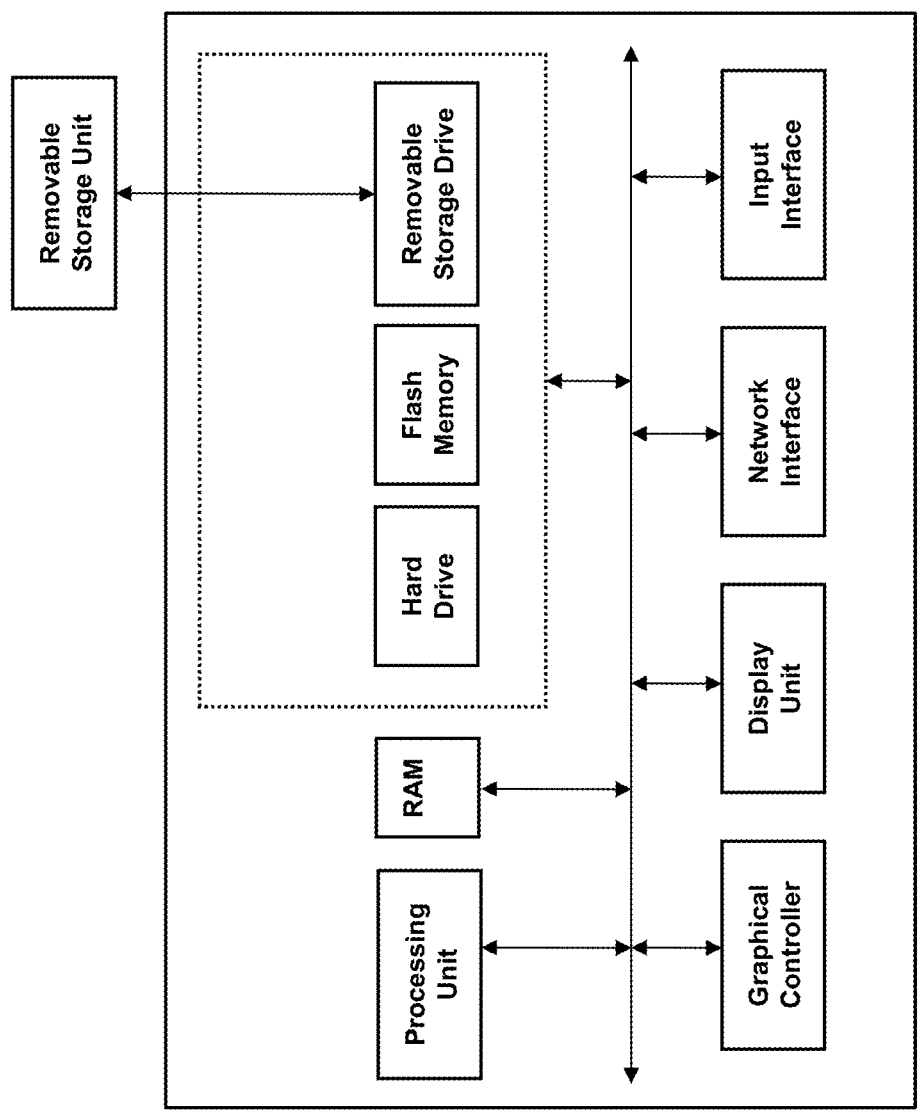
FIG. 16 illustrates a general computing environment for a tennis analysis system, according to various embodiments herein.

The hardware device of the analysis system can be any kind of device which can be programmed including e.g. any kind of computer like a server or a personal computer, or the like as illustrated by an example general computing environment in FIG. 16.

Thus, the means are at least one hardware means and at least one software means. The method embodiments described herein could be implemented in pure hardware, or partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

The invention claimed is:

1. A method for analyzing a tennis session for game improvement using a portable device and a tennis analysis system, said method comprising:
    collecting information from said tennis session using said portable device attached to a racket used in a game for a plurality of strokes, said information includes at least one among
        acceleration of the racket, rate of rotation of the racket for x, y, and z axis, swing speed of said racket, time markers, and result markers;
    transferring said collected information from said portable device to said tennis analysis system using a communication interface;
    analyzing information relating to said plurality of strokes, where said analysis includes at least classifying said stroke, by said tennis analysis system;
    analyzing information relating to collections of strokes from said plurality of strokes to identify rallies, games, sets and matches played during the session, by said tennis analysis system; and
    generating a plurality of game statistics using information available from said analysis of plurality of strokes and said analysis relating to a collection of strokes from said plurality of strokes, by said tennis analysis system,
    wherein said portable device comprises of a processor, a sensor module including at least a gyroscope sensor and an accelerometer sensor, and a plurality of communication interfaces, and wherein said tennis analysis system comprises a tennis analysis engine; and
    wherein classifying said stroke comprises:
        identifying stroke peak of said stroke,
        identifying category of said stroke, wherein said category is one among a short swing stroke, and a long swing stroke, and
        identifying type of said stroke, wherein the type of said stroke is identified based on number of consecutive data points in stroke window of said stroke with reference to a pre-defined threshold number.

2. The method of claim 1, wherein stroke peak of said stroke is identified when at least one condition among the following are met:
    centrifugal acceleration due to swing (oriented along Y axis) is at least 5 g of absolute acceleration;
    acceleration perpendicular to plane of racket (along Z axis) is at least 3 g; and
    square root of sum of squares of accelerations along X, Y, and Z axes is the highest within the stroke window and approximately at the middle of the stroke window,
    where stroke window of said stroke is a sequence of consecutive data points that span pre-defined duration.

3. The method of claim 1, wherein type of said stroke is one among forehand, backhand, serve, volley, and slice.

4. The method of claim 1, wherein said stroke is said long swing stroke when centrifugal force (Y axis) is above a pre-defined minimum threshold of at least 1 g that lasts for at least half of stroke window for said stroke.

5. The method of claim 4, wherein said stroke is a serve when acceleration along X axis is below a pre-defined negative threshold value for a pre-defined set of consecutive data points.

6. The method of claim 5, wherein said stroke is a first serve when said stroke immediately follows a stroke that is not a serve.

7. The method of claim 5, wherein said stroke is a second serve when said stroke immediately follows a serve within a pre-defined time interval.

8. The method of claim 4, wherein said stroke is a forehand stroke when at least one of the following conditions are met:
    the acceleration on the X and Z axes from an identified sample at intersection of X and Z axes before ball impact is positive, and if the X value is greater than Z value at the sample of largest divergence in the 10 samples window preceding the intersection sample;
    the acceleration on the X and Z axes from the identified sample at intersection of X and Z axes before ball impact is not positive, and if the X value is not greater than Z value at the sample of largest divergence in the last 10 samples window preceding the intersection sample.

9. The method of claim 4, wherein said stroke is a backhand stroke when at least one of the following conditions are met:
    the acceleration on the X and Z axes from an identified sample at intersection of X and Z axes before ball impact is positive, and if the X value is not greater than Z value at the sample of largest divergence in the 10 samples window preceding the intersection sample; and
    the acceleration on the X and Z axes from the identified sample at intersection of X and Z axes before ball impact is not positive, and if the X value is greater than Z value at the sample of largest divergence in the last 10 samples window preceding the intersection sample.

10. The method of claim 1, wherein said stroke is a short stroke when centrifugal force (Y axis) is above a pre-defined minimum threshold of at least 1 g that lasts for at most half of stroke window for said stroke.

11. The method of claim 10, wherein said stroke is a slice stroke when said stroke lasts for at least 35 data points.

12. The method of claim 10, wherein said stroke is a volley stroke when said stroke lasts no more than 35 data points.

13. The method of claim 1, wherein identifying type of stroke includes identifying the amount of spin imparted by said stroke to further classify the stroke as one among a top spin stroke, under spin stroke, and a flat stroke, where spin imparted is assessed using ratio obtained by dividing the peak acceleration along X axis by peak acceleration along Y axis.

14. The method of claim 1, wherein swing speed of the racket for a stroke is estimated using centrifugal acceleration of said stroke, where centrifugal accelerations is represented by $V^2/R$, where V=swing speed, and
R=radius of the instantaneous circle traced by said device.

15. The method of claim 1, wherein a statistic among said plurality of game statistics is arrived at using a combination of one or more analysis criteria among
  result marker;
  stroke type;
  direction of stroke;
  length of a rally;
  closing stroke of a rally;
  initiating stroke of a rally; and
  receiving stroke.

16. The method of claim 1, wherein analyzing information relating to said plurality of strokes further comprises identifying timing of each stroke, and sweet spot accuracy of said stroke.

17. The method of claim 16, wherein identifying timing of said stroke further comprises of:
  calculating racket preparation time as time lapse from the moment of start of the swing motion of the racket to the moment of impact of racket with a ball; and
  calculating follow through time as time lapse from the moment of impact of racket with the ball to the moment racket swing ends.

18. The method of claim 16, wherein said sweet spot accuracy of said stroke is determined using a ratio of vibration level and loss in momentum.

19. A system for analyzing a tennis session for game improvement, said system comprising:
  a portable device comprising a sensor module having at least a gyroscope sensor and an accelerometer sensor, an input mechanism for recording user input markers, a processor for processing information captured by said sensor module, said portable device configured to
    collect information from said tennis session using said portable device attached to a racket used in a game for a plurality of strokes, said information includes at least one among
      acceleration of the racket, rate of rotation of the racket for x, y, and z axis, swing speed of said racket, time markers, and result markers, and
    transfer said collected information to an external system using a communication interface;
  a tennis analysis system comprising a tennis analysis engine, said tennis analysis system configured to
    analyze information relating to said plurality of strokes, where said analysis includes at least classifying said stroke,
    analyze information relating to collections of strokes from said plurality of strokes to identify rallies, games, sets and matches played during the session,
    generate a plurality of game statistics using information available from said analysis of plurality of strokes and said analysis relating to a collection of strokes from said plurality of strokes, and
    provide visualization through said display interface for said analyzed information and said game statistics to aid in game improvement; and
  wherein classifying said stroke comprises:
    identifying stroke peak of said stroke,
    identifying category of said stroke, wherein said category is one among a short swing stroke, and a long swing stroke, and
    identifying type of said stroke, wherein the type of said stroke is identified based on number of consecutive data points in stroke window of said stroke with reference to a pre-defined threshold number.

* * * * *